(12) United States Patent
Cornali

(10) Patent No.: US 12,296,965 B2
(45) Date of Patent: May 13, 2025

(54) AIRPLANE COMPRISING A PASSENGER POD

(71) Applicant: Alessandro Cornali, Castenedolo (IT)

(72) Inventor: Alessandro Cornali, Castenedolo (IT)

(73) Assignee: Alessandro Cornali, Castenedolo (IT)

( * ) Notice: Subject to any disclaimer, the term of this patent is extended or adjusted under 35 U.S.C. 154(b) by 0 days.

(21) Appl. No.: 18/280,924

(22) PCT Filed: Feb. 23, 2022

(86) PCT No.: PCT/IB2022/051589
§ 371 (c)(1),
(2) Date: Sep. 7, 2023

(87) PCT Pub. No.: WO2022/189877
PCT Pub. Date: Sep. 15, 2022

(65) Prior Publication Data
US 2024/0140609 A1 May 2, 2024

(30) Foreign Application Priority Data
Mar. 12, 2021 (IT) .................. 102021000005921

(51) Int. Cl.
*B64D 25/12* (2006.01)
*B64C 1/32* (2006.01)

(52) U.S. Cl.
CPC ............. *B64D 25/12* (2013.01); *B64C 1/32* (2013.01)

(58) Field of Classification Search
CPC .................................. B64C 25/12; B64C 1/32
See application file for complete search history.

(56) References Cited

U.S. PATENT DOCUMENTS 2,684,219 A * 7/1954 Thunbo .................. B64D 25/12
  244/140
5,356,097 A * 10/1994 Chalupa ................. B64D 25/12
  244/139

(Continued)

FOREIGN PATENT DOCUMENTS

CN      105947223 A     9/2016
DE      20301271 U1 *   5/2003  ............. B64D 25/12

(Continued)

OTHER PUBLICATIONS

European Patent Office, International Search Report issued in PCT/IB2022/051589, mailed May 19, 2022, Rijswijk, NL.

(Continued)

*Primary Examiner* — Richard G Davis
(74) *Attorney, Agent, or Firm* — Ferguson Case Orr Paterson

(57) ABSTRACT

An airplane mainly extending along an axis between a nose group and a tail group is provided. The airplane has a fuselage extending axially between the nose group and the tail group and having a fuselage wall internally defining a fuselage housing, wings extending transversely to the axis from the fuselage, and at least one passenger pod having a pod wall defining a pressurized passenger housing in which passengers are accommodable. The at least one passenger pod is removably housable in the fuselage housing. The airplane is configurable in an operating configuration, suitable for allowing flight of the airplane, in which the at least one passenger pod is housed in the fuselage housing and an emergency configuration, in which, with the airplane in flight, the at least one passenger pod is ejected from the fuselage housing.

12 Claims, 7 Drawing Sheets

(56) References Cited

U.S. PATENT DOCUMENTS

| | | | | |
|---|---|---|---|---|
| 5,921,504 A * | 7/1999 | Elizondo | ................ | B64D 25/12 |
| | | | | 244/140 |
| 6,213,427 B1 * | 4/2001 | Mareska | ................ | B64D 11/00 |
| | | | | 244/120 |
| 6,382,563 B1 * | 5/2002 | Chiu | ...................... | B64D 25/12 |
| | | | | 244/140 |

FOREIGN PATENT DOCUMENTS

| | | | | | |
|---|---|---|---|---|---|
| EP | 1110861 A1 | | 6/2001 | | |
| EP | 3335983 A1 | | 6/2018 | | |
| GB | 2376669 A | * | 12/2002 | ............. | B64D 25/12 |
| WO | WO-2004078588 A1 | * | 9/2004 | ............. | B64C 39/02 |
| WO | WO-2007092015 A1 | * | 8/2007 | ............. | B64D 25/12 |

OTHER PUBLICATIONS

European Patent Office, International Written Opinion issued in PCT/IB2022/051589, mailed May 19, 2022.

Italian Search Report issued in Italian Application No. 202100005921, mailed Nov. 24, 2021.

* cited by examiner

AIRPLANE COMPRISING A PASSENGER POD

CROSS-REFERENCE TO RELATED APPLICATIONS

This application is a National Phase Application of PCT International Application No. PCT/IB2022/051589, having an International Filing Date of Feb. 23, 2022 which claims the benefit of priority to Italian Patent Application No. 102021000005921, filed Mar. 12, 2021, each of which is hereby incorporated by reference in its entirety.

FIELD OF THE INVENTION

The present invention relates to an airplane. In addition, the present invention relates to a passenger pod comprised in said airplane.

In particular, the present invention is in the field of air transportation vehicles, such as military and civil airplanes. In the further discussion, the term "airplane" is used to refer to both civilian aircraft and military aircraft.

BACKGROUND OF THE INVENTION

It is well known that, in situations of serious emergency during flight, for example in the case of a breakdown, the airplane runs the risk of crashing to the ground, causing the death of the people on board.

In the state of the art, airplane solutions are known which, in severe emergency situations, allow the release of parts of the aircraft that house pilots and passengers.

However, the solutions of the prior art are extremely disadvantageous, as they require an extensive redesign of the airplane. In particular, these solutions involve connection systems between the parts that are particularly complex and expensive, and therefore disadvantageous to produce.

SUMMARY OF THE INVENTION

The object of the present invention is to solve the problems of the prior art by providing an airplane solution that handles emergency situations efficiently and effectively.

Said object is achieved by the airplane described and claimed herein. In addition, this object is also achieved by the passenger pod described and claimed herein. Further technical benefits are also described.

BRIEF DESCRIPTION OF THE DRAWINGS

In addition, further features and advantages of the invention will become clear from the description provided below of its preferred embodiments given as non-limiting examples in reference to the attached figures, wherein.

DETAILED DESCRIPTION

Figure 1:
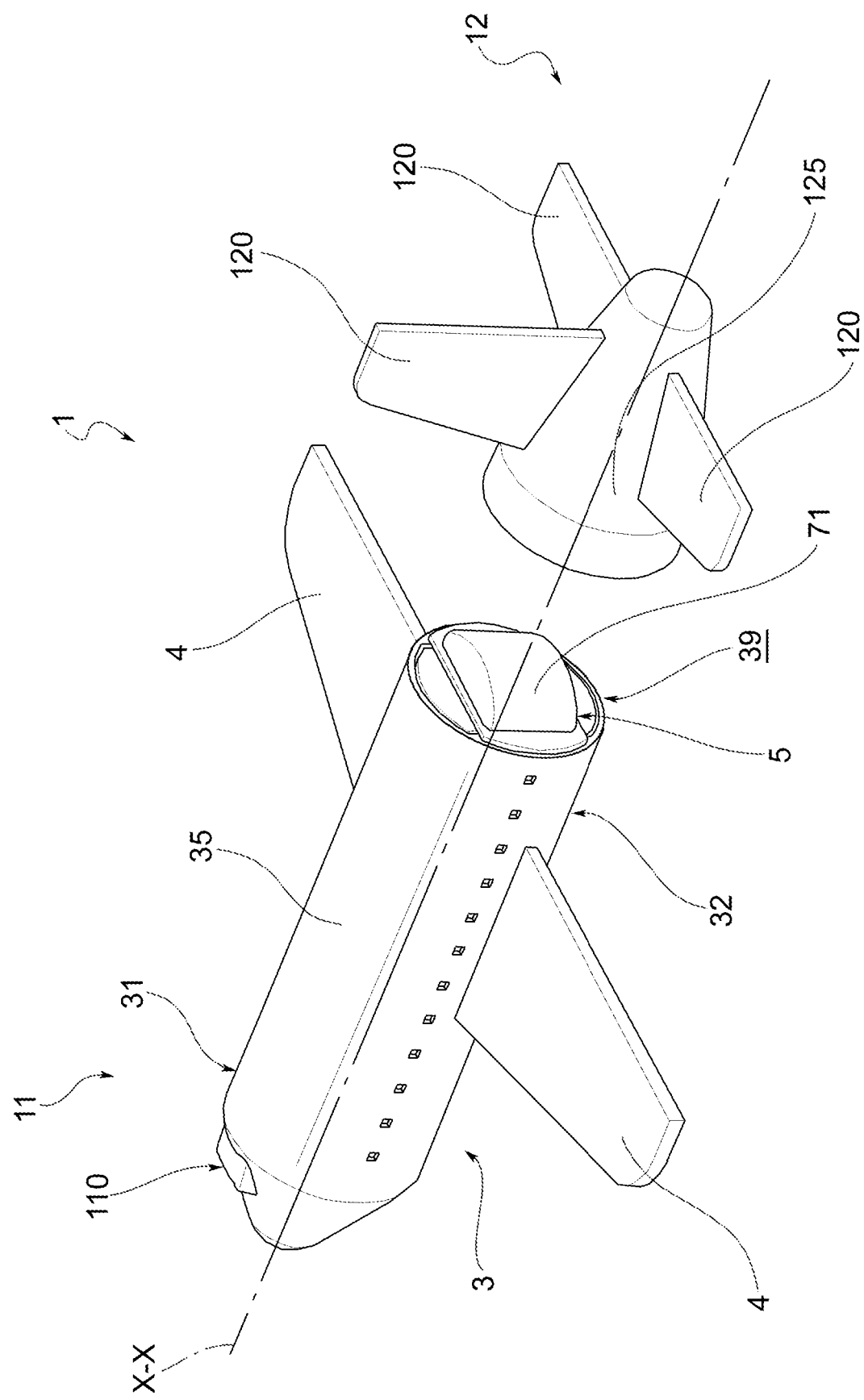
FIG. 1 is a perspective view of separate parts of an airplane in accordance with the present invention, according to a preferred embodiment, configured in an emergency configuration.
Figure 2:
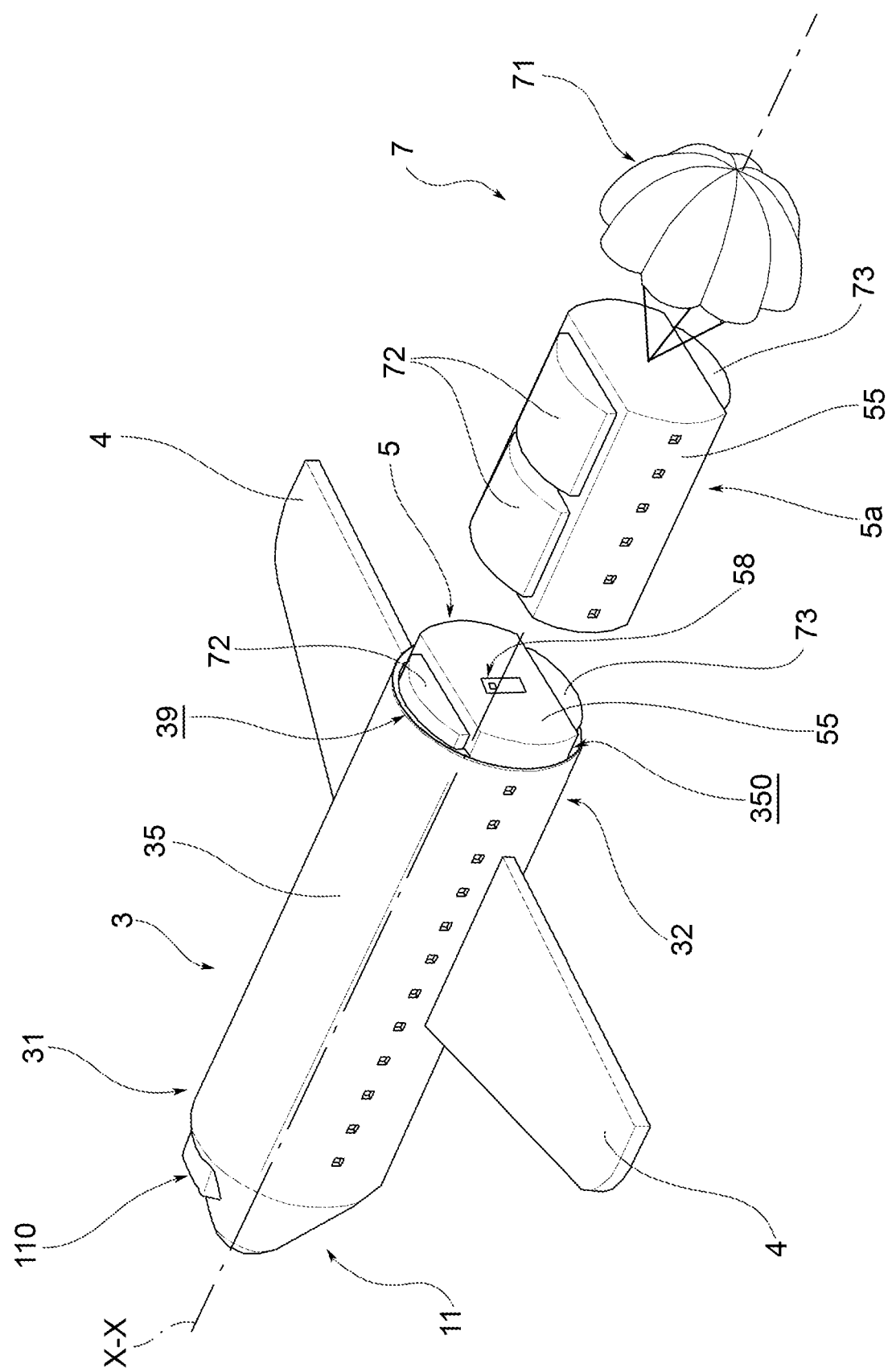
FIG. 2 is a further perspective view of the airplane shown in FIG. 1, configured in an emergency configuration.

With reference to the appended figures, an airplane according to the present invention is in its entirety denoted with the number 1.

According to the present invention, the airplane 1 extends along an axis X-X between a nose group 11, comprising a pressurized cockpit 110, and a tail group 12, comprising the empennage members 120, i.e., the members acting to stabilize and control the airplane.

According to the present invention, the airplane 1 comprises a fuselage 3, i.e., a fusiform body, extending longitudinally along the axis X-X.

For example, in a preferred embodiment, the fuselage 3 is of the type with a circular cross-section or rectangular cross section or ovalized or with circular lobes.

According to the present invention, the fuselage 3 extends along the axis X-X between the nose group 11 and the tail group 12 and comprises a fuselage wall 35 that internally defines a fuselage housing 350.

In other words, the fuselage wall 35 comprises an outer surface in contact with the external environment, and is provided, therefore, with the physical and structural features necessary to enable the flight of the airplane 1.

According to the present invention, the airplane 1 comprises wings 4 extending transversely about the axis X-X from the fuselage 3.

In a preferred embodiment, the wings 4 are connected to the fuselage wall 35.

According to a preferred embodiment, the wings are of the low-wing type, that is, the wings are attached to the airplane 1 in a lower region 351 of the fuselage, giving greater maneuverability to the airplane 1 even in situations where the airplane 1 fails.

According to a further preferred embodiment, the wings are of the mid-wing type.

According to a further variant embodiment, the wings are of the high-wing or parasol type.

Further, according to the present invention, the airplane 1 comprises at least one passenger pod 5 in which passengers are accommodated during the flight, for example comprising a plurality of rows of seats.

The passenger pod 5 comprises a pod wall 55, which internally defines a pressurized passenger housing 550 in which the passengers are accommodated.

The passenger pod 5 is removably housed in the fuselage housing 350 as described below and as amply illustrated in the appended figures.

In other words, passengers of the airplane 1 are accommodated in the passenger housing 550 comprised in the passenger pod 5.

According to the present invention, the airplane 1 is configurable in an operating configuration, suitable for allowing the airplane 1 to fly, wherein the passenger pod 5 is housed in the fuselage housing 350, and in an emergency configuration, wherein, with the airplane 1 in flight, the passenger pod 5 is ejected from fuselage housing 350.

According to a preferred embodiment, the fuselage 3 extends axially between a nose end 31, proximal to the nose group 11, and a tail end 32, proximal to the tail group 12.

In a preferred embodiment, the fuselage 3 comprises an operating opening 39, through which, in the emergency configuration, the passenger pod 5 is ejected.

In addition, in a preferred embodiment, the passenger pod 5 is insertable into the fuselage housing 350 through the operating opening 39, for example during passenger boarding operations in the airplane 1.

According to a preferred embodiment, the operating opening 39 is positioned at the tail end 32 of the fuselage 3.

According to a preferred embodiment, the operating opening 39 is positioned transversely to the axis X-X.

In other words, said operating opening 39 is an opening made in the fuselage wall 35 facing axially toward the tail group 12. Said operating opening 39 is traversable by the passenger pod 5 in the axial direction.

According to a preferred embodiment, the tail group 12 comprises a movable body 125 which is configurable to open to allow the passenger pod 5 to exit the fuselage housing 350 through the operating opening 39.

According to a preferred embodiment, the movable body 125 is configurable to open to allow the passenger pod 5 to exit from the fuselage housing 350 through the operating opening 39 in the emergency configuration.

In addition, in a preferred embodiment, the movable body 125 is configurable to close the operating opening 39, thereby preventing the passenger pod 5 from passing through the operating opening 39.

According to a preferred embodiment, the movable body 125 is attached to the tail end 32 of the fuselage 3.

In a preferred embodiment, the movable body 125 is also configurable in opening and closing on the ground, i.e., during passenger loading and unloading operations performed by moving the passenger pod 5.

According to a preferred embodiment, the movable body 125 is configurable in opening and closing both on the ground and in flight, i.e., in the operating configuration and in the emergency configuration.

In a preferred embodiment, the movable body 125 is removably connected to the fuselage 3.

In a preferred embodiment, the movable body 125 is hinged to the fuselage 3, e.g., it is hinged to the tail end 32, such that it is rotatable about one or more axes of rotation, i.e., configurable to open.

In a preferred embodiment, depicted by way of example in FIG. 1, the movable body 125 comprises all of the empennage members 120 positioned in the tail group 12.

Figure 3A:
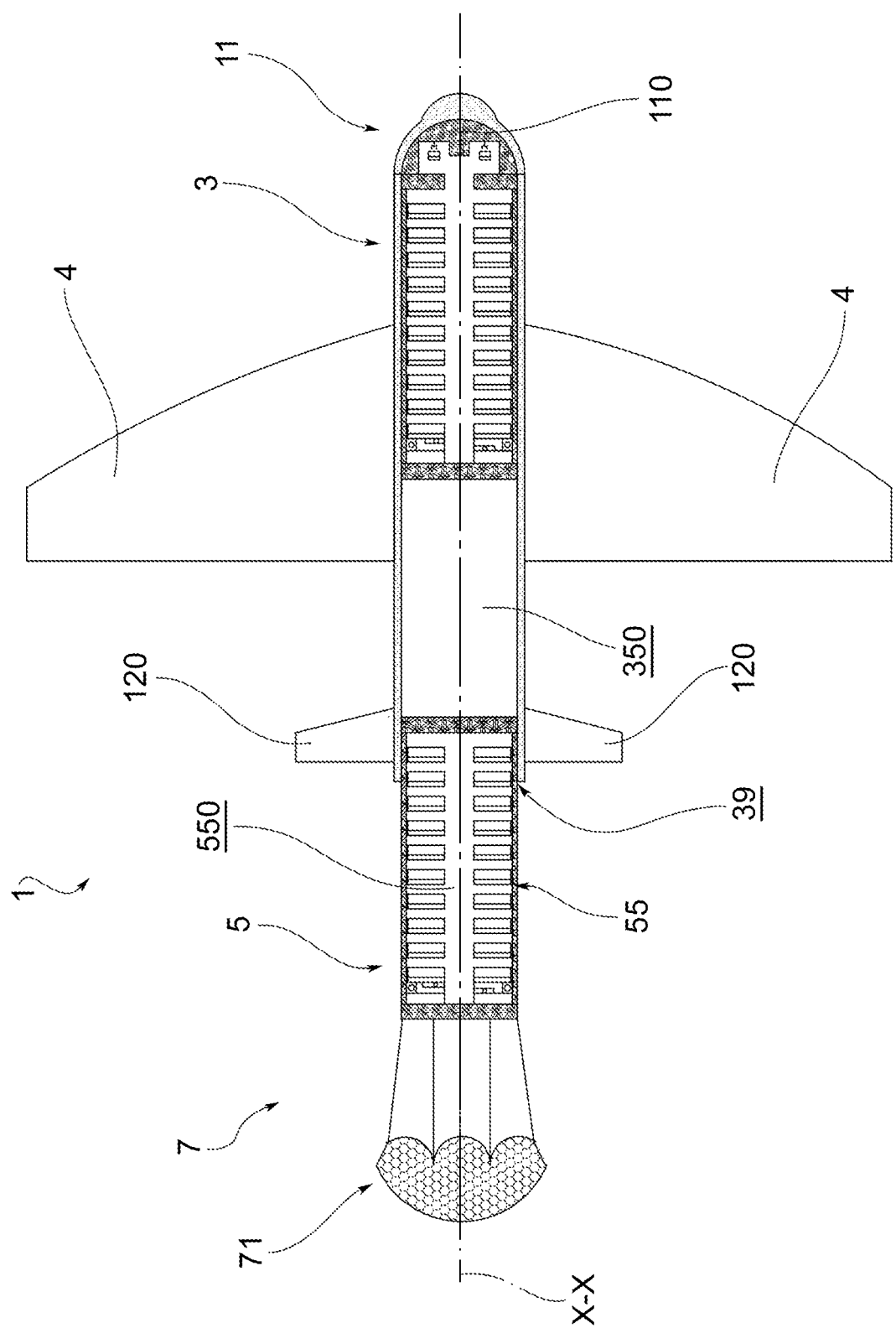
FIGS. 3*a* and 3*b* are, respectively, a top cross-sectional view and a side cross-sectional view of an airplane in accordance with the present invention according to a preferred embodiment.
Figure 3B:
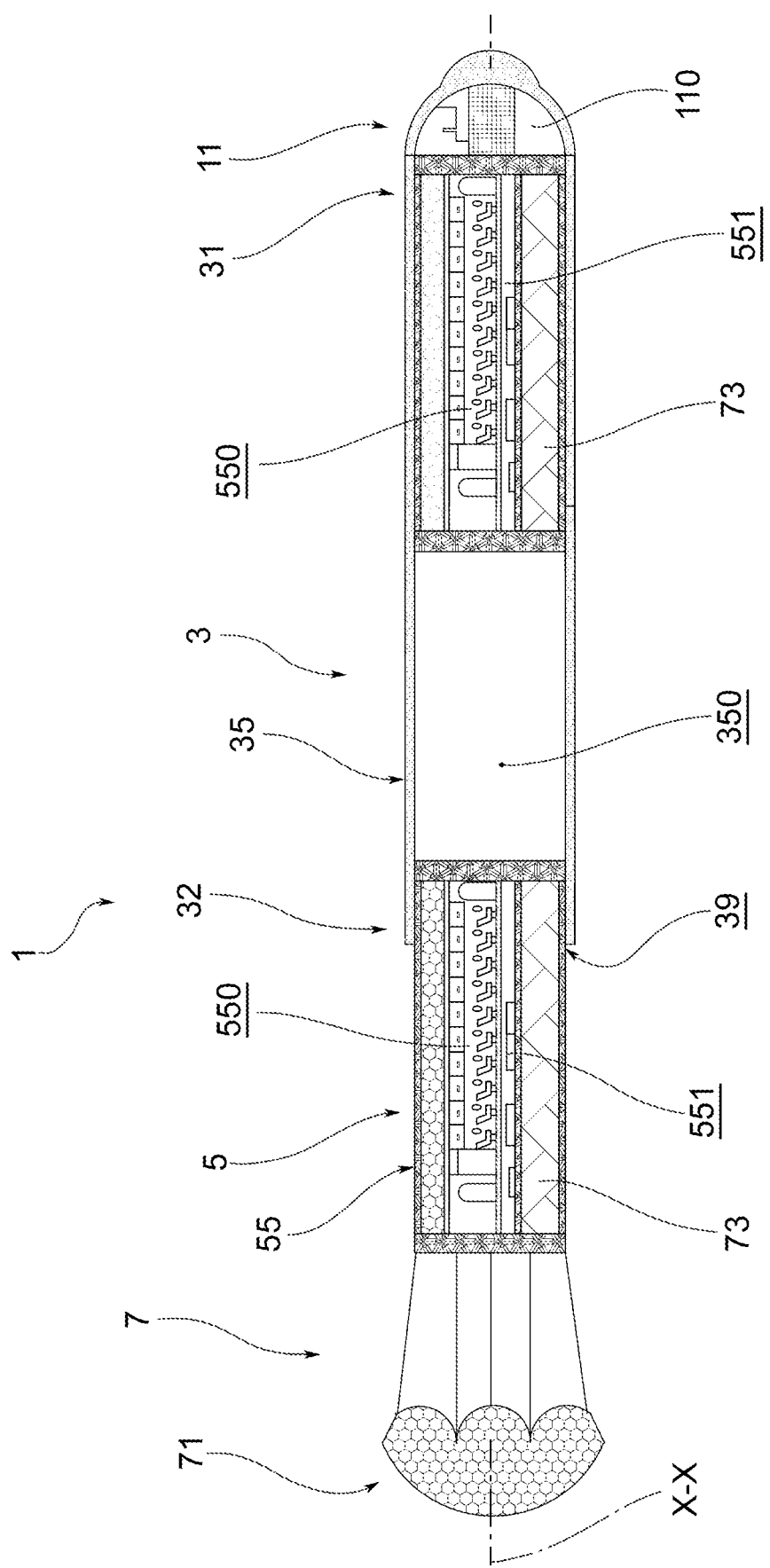
Figure 4A:
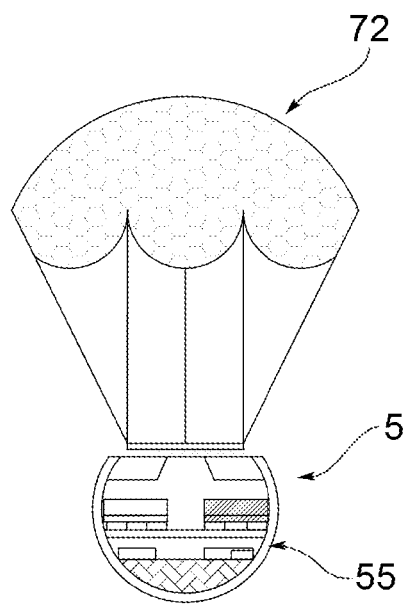
FIG. 4*a*, 4*a'* are, respectively, a front cross-sectional view and a longitudinal cross-sectional view of a passenger pod in accordance with the present invention, according to a preferred embodiment, with the parachute device deployed.
Figure 4A:
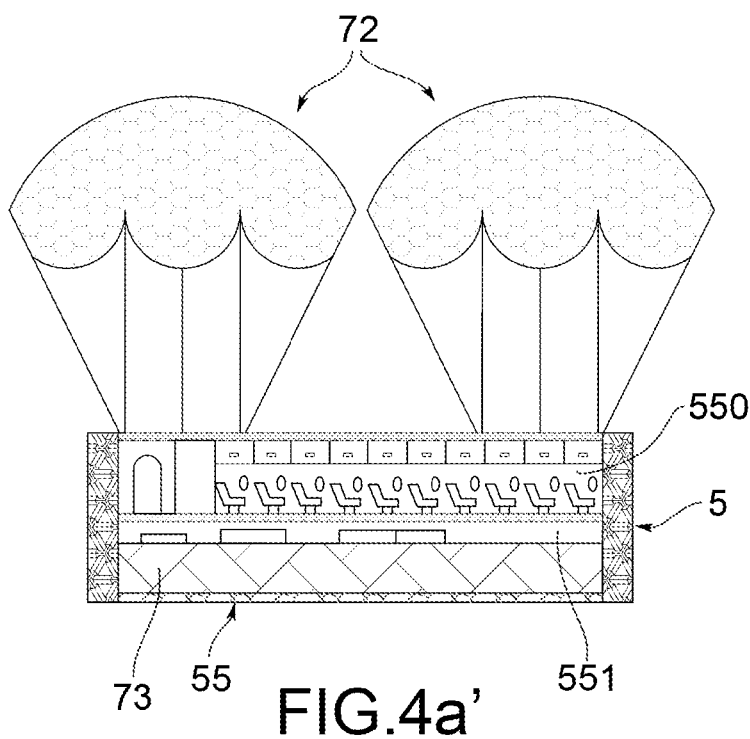
Figure 4B:
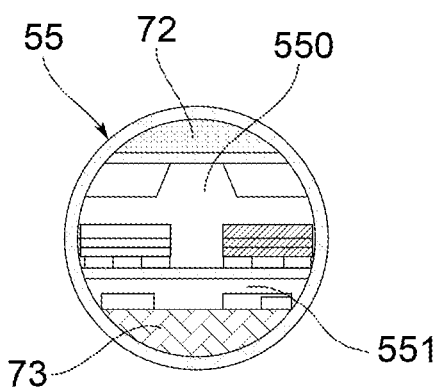
FIG. 4*b*, 4*b'* are, respectively, a front cross-sectional view and a longitudinal cross-sectional view of a passenger pod in accordance with the present invention, according to a preferred embodiment.
Figure 4B:
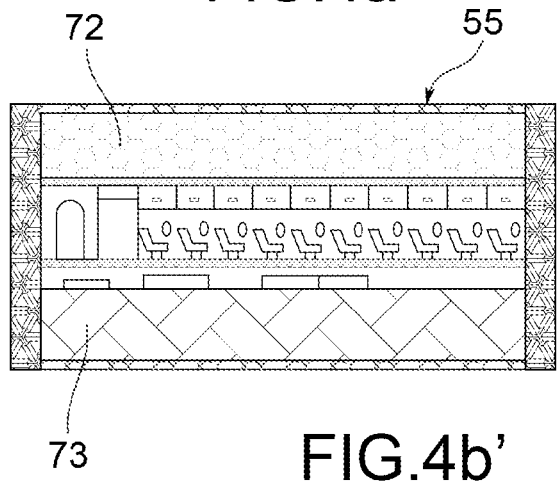
Figure 4C:
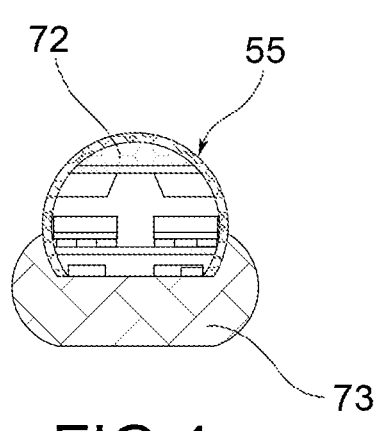
FIG. 4*c*, 4*c'* are, respectively, a front cross-sectional view and a longitudinal cross-sectional view of a passenger pod in accordance with the present invention, according to a preferred embodiment; with the inflatable floating device inflated.
Figure 4C:
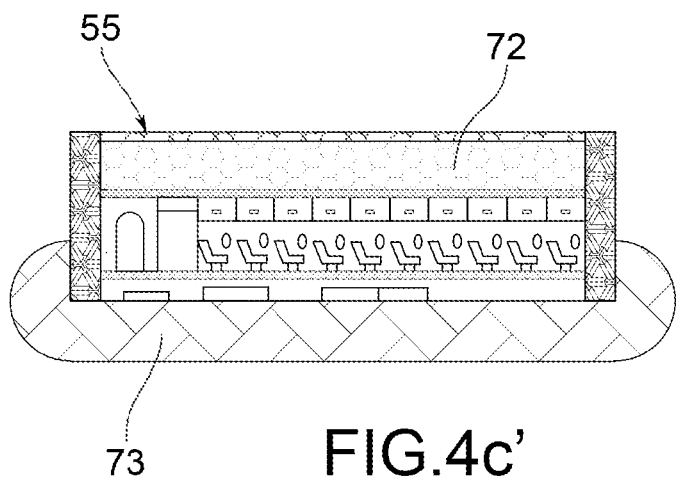
Figure 5:
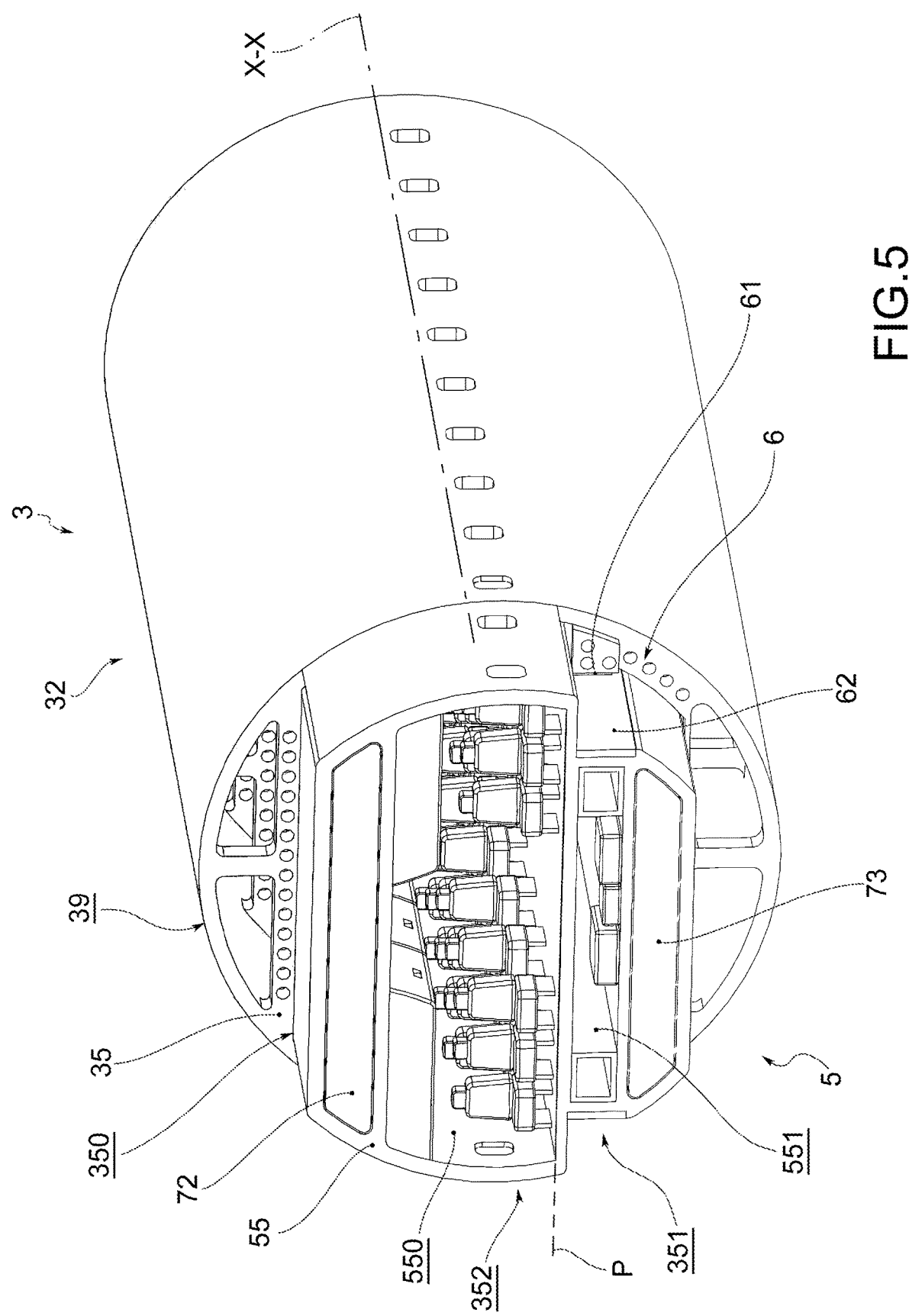
FIG. 5 is a perspective view of a region of the airplane in accordance with the present invention, according to a preferred embodiment, in an emergency configuration.
Figure 6:
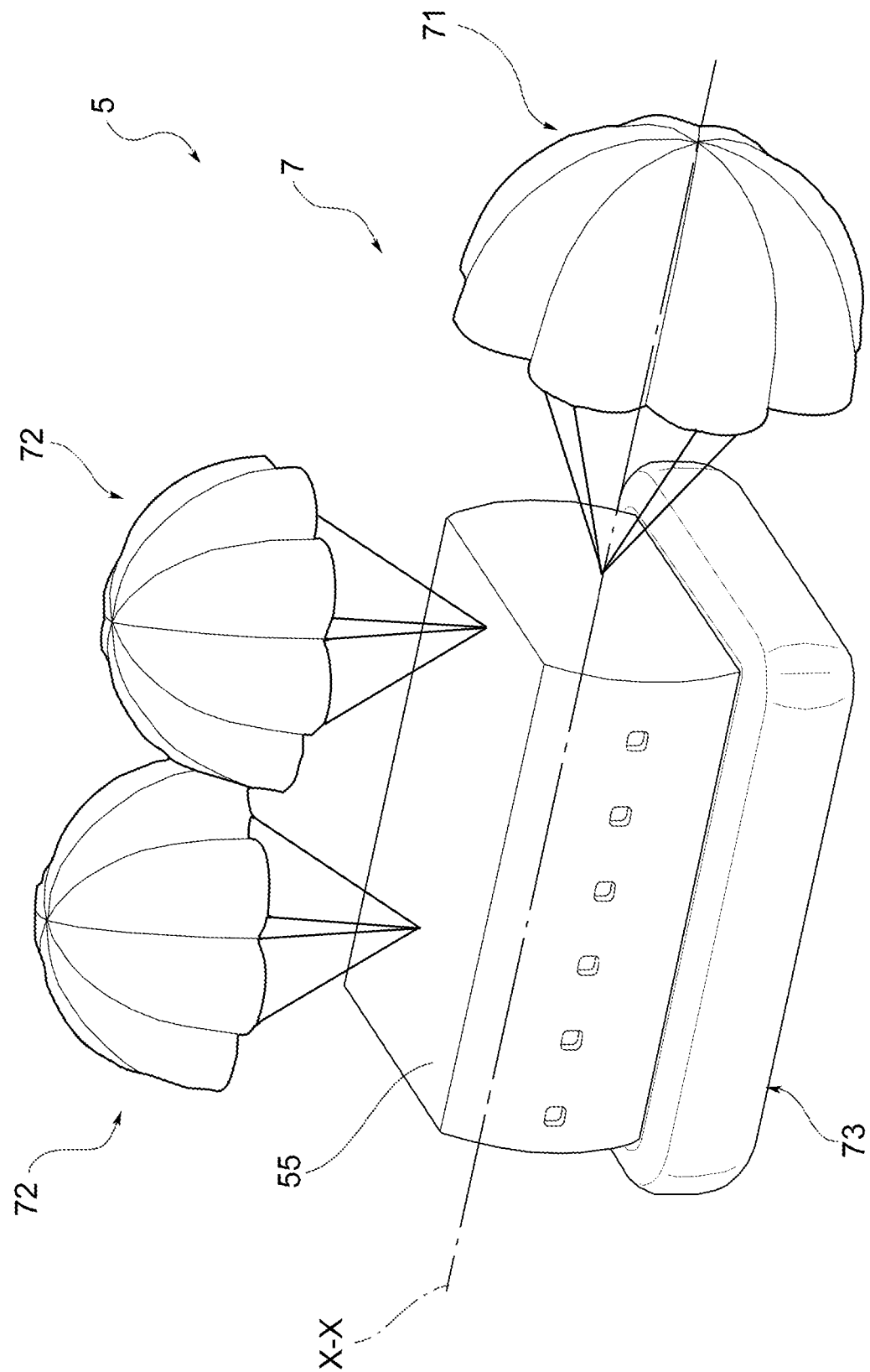
FIG. 6 is a perspective view of a passenger pod in accordance with the present invention, according to a preferred embodiment, with the parachute device deployed and the inflatable floating device inflated.

In a further preferred embodiment, shown by way of example in FIG. 3*a*, a portion of the empennage members 120 are connected to the fuselage 3, preferably to the fuselage wall 35, preferably to the tail end 32.

According to a further preferred embodiment, in the emergency configuration, the movable body 125 is completely disconnected from the fuselage 3, such that it detaches completely and lands on the ground independently of the airplane 1, preferably in a controllable manner.

Preferably, in the embodiment wherein the movable body 125 is fully disconnectable from the fuselage 3 in the emergency configuration, the empennage members 120 attached to the movable body 125 are completely disconnected from the airplane 1, while the empennage members 120 connected to the fuselage 3 remain connected to the airplane 1.

In a further preferred embodiment, not shown by way of example in the figures, the operating opening 39 is a radial opening made in the fuselage wall 35, traversable by the passenger pod 5 in a direction transverse to the axis X-X.

According to a preferred embodiment, the airplane 1 comprises pod-connecting members 6 suitable for removably connecting the passenger pod 5 to the fuselage 3.

According to a preferred embodiment, said pod-connecting members 6 are housed in the fuselage housing 350 and in the passenger pod 5.

In a preferred embodiment, in the emergency configuration, said pod-connecting members 6 are controlled in a release configuration such that the passenger pod 5 is ejected from the fuselage housing.

According to a preferred embodiment, the pod connecting members 6 comprise at least one fuselage track 61 and at least one pod track 62 complementary to said fuselage track 61.

Preferably, said at least one fuselage track 61 and said at least one pod track 62 extend along the axis X-X.

For example, in a preferred embodiment, the pod connecting members 6 comprise two fuselage tracks 61 and two pod tracks 62, complementary to the fuselage tracks 61, extending along the axis X-X.

According to a preferred embodiment, the pod-connecting members 6 are of the magnetic levitation type, i.e., wherein the support is of the magnetic field type, and electromagnetic force is used to counteract the gravitational force.

In other words, the electromagnetic force generated by the pod connecting members 6 allows the weight of the at least one passenger pod 5 to be offset, allowing the passenger pod 5 to be free to move axially in the fuselage housing 350.

In a preferred embodiment, the pod connecting members 6 allow the at least one passenger pod 5 to be locked axially in the fuselage housing 350.

According to a preferred embodiment, the pod connecting members 6 are polarizable in a commandable manner as a function of the needs.

According to a preferred embodiment, in effect, the pod connecting members 6 allow the at least one passenger pod 5 to be locked according to the polarity respectively assumed by the at least one fuselage track 61 and the at least one pod track 62.

According to a preferred embodiment, in effect, the polarity assumed by the at least one fuselage track 61 and the at least one pod track 62 is discordant, i.e., the at least one fuselage track 61 and the at least one pod track 62 are held in contact by a magnetic force, blocking the at least one passenger pod 5.

According to a preferred embodiment, the pod connecting members 6 eject the at least one passenger pod 5, in the emergency configuration.

Preferably, the pod connecting members 6 are commandable, and in particular the reciprocal magnetic action is commandable, such that the passenger pod 5 is moved axially, for example by commanding its ejection.

In a preferred embodiment, the pod connecting members 6 are of the type that is part of EMS (electromagnetic suspension) or EDS (electrodynamic suspension) technologies.

According to a preferred embodiment, the fuselage track 61 is of the passive type and the pod track 62 is of the active type.

For example, in a preferred embodiment, the fuselage track 61 comprises a ferromagnetic material and the pod track 62 comprises a superconducting electromagnet that is configurable between an active configuration, in which it generates a magnetic field, and a passive configuration.

According to a further preferred embodiment, the fuselage track 61 is of the active type and the pod track 62 is of the passive type.

For example, in a preferred embodiment, the pod track 62 comprises a ferromagnetic material and the fuselage track 61 comprises a superconducting electromagnet, configurable between an active configuration, in which it generates a magnetic field, and a passive configuration.

According to a preferred embodiment, the pod connecting members 6 are suitably commandable in the release configuration to perform the ejection of the passenger pod 5; for example, in a preferred embodiment the at least one fuselage track 61 and the at least one pod track 62 are progressively excitable along the axis X-X involving the action of ejecting the at least one passenger pod from the fuselage housing 350.

Thus, the airplane 1 allows for rapid and efficient ejection of the at least one passenger pod 5. The presence of magnetic levitation tracks, in effect, greatly facilitates the extraction of at least one passenger pod 5, as it eliminates friction, such as from contact and sliding, generated between the fuselage wall 35 and the pod wall 55.

In other words, the activation of the pod connecting members 6 act in an impulsive manner on the at least one passenger pod 5, in an amount proportional to the speed of the airplane 1 at the same instant of time.

According to a preferred embodiment, the airplane 1 allows the at least one passenger pod 5 to be ejected while avoiding imparting a recoil action on said passenger pod 5 and thus on the passengers therein.

Specifically, in a preferred embodiment, the at least one passenger pod 5 comprises a walking surface P, on which passengers accommodated in the passenger housing 550 walk, which divides the fuselage housing 350 into a lower region 351 and an upper region 352.

In a preferred embodiment, therefore, the pod-connecting members 6, preferably the at least one fuselage track 61 and the at least one pod track 62, are positioned below said walking surface P.

In other words, the pod-connecting members 6, preferably the at least one fuselage track 61 and the at least one pod track 62, are positioned radially external to said walking surface P.

According to a preferred embodiment, the at least one fuselage track 61 and the at least one pod track 62 are positioned in the lower region 351 of the fuselage housing 350.

According to a preferred embodiment, therefore, in the operating configuration, the pod wall 55 is spaced apart from the fuselage wall 35, i.e., said wall forms a gap in the radial direction with the fuselage wall 35.

For example, in a preferred embodiment, said gap is within the upper region 352 and, with the pod track 62 or the fuselage track 61 active, i.e., kept mutually spaced, the passenger pod 5 is moved in such a way as to at least partially compensate for said gap.

In a preferred embodiment, the gap radially comprised between pod wall 55 and fuselage wall 35 is occupied by an elastically deformable material.

According to a preferred embodiment, the passenger pod 5 comprises a drogue parachute group 7 comprising a drogue parachute device 71, wherein, in the emergency configuration, said drogue parachute device 71 is configurable to pull the at least one passenger pod 5 outside the fuselage housing 350 axially.

In other words, said drogue parachute device 71 is an aerodynamic brake.

According to a preferred embodiment, the drogue parachute device 71 is complementary to the pod connecting members 6, i.e., it is operable in parallel with or in aid of the pod connecting members 6 to eject the at least one passenger pod 5.

In the emergency configuration, therefore, the synergistic action of the pod-connecting members 6, preferably of the at least one fuselage track 61 and pod track 62, and of the drogue parachute group 7, preferably of the drogue parachute device 71, allow the at least one passenger pod 5 to be extracted from the fuselage housing 350 in a manner that is extremely quick and effective, thereby securing the passengers enclosed therein.

In a further preferred embodiment, the drogue parachute device 71 is subordinate to the pod connecting members 6, i.e., it is activatable in place of or as an alternative to the pod connecting members 6.

According to a preferred embodiment, the drogue parachute device 71 is suitable to operate in performing the extraction of the passenger pod 5, for example in a situation of the pod-connecting members 6 malfunctioning.

In a preferred embodiment, in the operating configuration, the drogue parachute device 71 is configured in a folded position and is comprised in the pod wall 55. Further, in the emergency configuration, said drogue parachute device 71 is deployed outside the pod wall 55, while remaining connected to the passenger pod 5, in such a way as to apply a pulling force on the passenger pod 5, so as to extract the passenger pod 5 out of the fuselage housing 350.

In a preferred embodiment, the airplane 1 comprises a plurality of independently pressurized passenger pods 5 that are mutually connected and housed in a row along the axis X-X within the fuselage housing 350.

In other words, the passengers of the airplane 1 are accommodated and divided into the plurality of passenger pods 5, each containing a plurality of rows of seats.

In a preferred embodiment, adjacent passenger pods 5 along the axis X-X are communicating, for example by means of an automated door 58 traversable by the passengers.

According to a preferred embodiment, the drogue parachute group 7 is configurable to pull each passenger pod 5 outside of the fuselage housing 350.

According to a preferred embodiment, a main passenger pod 5a, i.e., the passenger pod 5 positioned at a position proximal to the operating opening 39, comprises the drogue parachute device 71.

In other words, the main passenger pod 5a is the passenger pod located at the tail end 32 of the fuselage 3.

In a preferred embodiment, therefore, all remaining passenger pods 5 lack a drogue parachute device 71 and are directly connected by anchoring means, for example preferably removable ropes or hooks, to said main passenger pod 5a.

In a preferred embodiment, the passenger pods 5, lacking a drogue parachute device, are mutually connected to each other in such a way as to be indirectly connected to the main passenger pod 5a, therefore, in such a way as to follow its movement.

In a further preferred embodiment, each passenger pod 5 comprises a drogue parachute device 71, regardless of its position in the row.

In a preferred embodiment, all the passenger pods 5 are mutually connected to each other by anchoring means, for example by means of preferably removable ropes or hooks.

In a preferred embodiment, irrespective of the presence of one or more drogue parachute devices 71, in the emergency configuration, said anchoring means are removable so that the passenger pods 5 land independently of each other.

According to a preferred embodiment, the drogue parachute group 7 comprises at least one parachute device 72, for example a pair of parachute devices 72 for each passenger pod 5.

Said at least one parachute device 72, in the emergency configuration, is configurable to slow the fall of the at least one passenger pod 5.

In a further preferred embodiment, the parachute device 72 positioned in the closed position is housed in the pod wall 55, in an upper region.

According to a preferred embodiment, the drogue parachute group 7 further comprises at least one inflatable floating device 73, e.g., one inflatable floating device 73 for each passenger pod 5, configurable to keep the at least one passenger pod 5 afloat when landing on water.

In a further preferred embodiment, the inflatable floating device 73 is positioned in the deflated position and is housed in the pod wall 55, in a lower region.

According to a preferred embodiment, the passenger pod 5 comprises a pressurized cargo hold room 551, which in turn is comprised in the pod wall 55 and is separated from the passenger housing 550, said cargo hold room 551 being suitable for holding pets, cargo, and luggage. Preferably, said cargo hold room 551 is positioned below the walking surface P.

As mentioned above, the subject of the present invention is also to provide a passenger pod 5 housable in extractable manner in the fuselage housing 350 of an airplane 1 having the features described above.

Said passenger pod 5 comprises a pod wall 55 that internally defines a pressurized passenger housing 550 in which passengers are accommodated, for example comprising a plurality of rows of seats.

Said passenger pod 5 further comprises all of the features mentioned above, and all of the benefits described below.

Innovatively, the airplane and passenger pod according to the present invention largely fulfill the intended object by overcoming the problems typical of the prior art.

Advantageously, in effect, the airplane is equipped with a high security passenger pod for passengers in emergency situations.

Advantageously, it is possible to integrate the passenger pod into an airplane by making only minor changes to the design of the airplane itself, thus preserving the overall structure that optimizes its aerodynamics.

Advantageously, it is possible, in serious emergency situations, to eject passenger pods in which people are present, i.e., abandoning the airplane destined to crash to the ground.

Advantageously, the pod connecting members and the drogue parachute device are configurable to allow an extremely fast and effective ejection of the passenger pods from the fuselage.

Advantageously, in effect, with the drogue parachute device deployed and the pod connecting members in the release configuration, passenger pods are directly or indirectly pulled out of the fuselage housing, thus abandoning the fuselage housing.

Advantageously, the airplane ejects the at least one passenger pod while avoiding imparting a recoil action on said passenger pod, increasing the safety for the passengers transported therein.

Advantageously, the airplane performs the ejection of the passenger pod also in a situation of malfunction of some airplane components.

Advantageously, in effect, the synergic presence of the pod connecting members and of the drogue parachute device allows an ejection of the passenger pod in a situation of malfunction of the pod connecting members.

Advantageously, the airplane saves a considerable amount of fuel, having a low environmental impact.

Advantageously, in effect, it is possible to insert in the airplane only the necessary passenger pods, leaving unneeded passenger pods on the ground, i.e., with real advantages in terms of transported weight. Therefore, it is advantageous to insert only the minimum number of passenger pods required to carry the persons who have purchased a ticket for a particular flight. For example, it is advantageously possible to insert only one passenger pod, thus increasing the flexibility in using an airplane.

In addition, in flights carrying fewer passengers than the maximum capacity, it is also possible to fill the aircraft with passenger pods appropriately designed for the transport of cargo.

Advantageously, the airplane is simple to design.

Advantageously, in effect, the presence of one or more dedicated drogue parachute devices for each passenger pod allows the use of drogue parachute devices, parachutes, and floating devices of small dimensions, and therefore light and economical, resulting in a simple design and saving further fuel costs. Advantageously, in effect, as the drogue parachute group must support the weight of one, or at the most a plurality, of passenger pods, but not the entire airplane structure, it has a reduced size, cost, and weight.

Advantageously, therefore, the drogue parachute device is not very voluminous with respect to the volumes defined in the fuselage.

Advantageously, the presence of an inflatable floating device allows a pod landing on a body of water to be kept afloat.

Advantageously, the airplane is suitable for blocking and ejecting the pods in an extremely effective way.

Advantageously, in effect, the pod-connecting members are configurable for axially locking the passenger pods.

Advantageously, the pod-connecting members are configurable for ejecting the passenger pods.

Advantageously, in effect, with activated magnetic levitation tracks, the friction between the passenger pod and the fuselage housing is considerably reduced, as there is no more sliding between the respective surfaces that were in contact before, thus favoring the extraction of passenger pods in a smooth and fast way.

Advantageously, it is possible to load and unload passengers in an effective and efficient manner. Advantageously, in effect, the passengers are first loaded into the passenger pods and, subsequently, the loaded passenger pods are inserted into the fuselage housing.

Advantageously, the airplane object of the present invention simplifies both passenger loading and unloading operations, improving the overall airport management. In effect, by carrying out the boarding activities independently from the aircraft, it is possible to minimize the time on the ground, i.e., stopping the aircraft only for the time necessary to refuel and load the passenger pods.

Advantageously, the airplane is of the type comprising highly maneuverable wings, i.e., it allows the airplane to be maneuvered effectively even in emergency situations.

It is clear that a person skilled in the art may make changes to the invention described above in order to meet contingent needs, all falling within the scope of protection as defined in the following claims.

What is claimed is:

1. An airplane, mainly extending along an axis (X-X) between a nose group comprising a cockpit, and a tail group comprising empennage members, wherein the airplane comprises:
   i) a fuselage extending axially between the nose group and the tail group, comprising a fuselage wall internally defining a fuselage housing;
   ii) wings extending transversely to the axis (X-X) from the fuselage;
   iii) at least one passenger pod comprising a pod wall internally defining a pressurized passenger housing in which passengers are accommodable, wherein said at least one passenger pod is removably housable in the fuselage housing; and
   iv) pod-connecting members housed in the fuselage housing and in the at least one passenger pod, suitable for removably connecting the at least one passenger pod to the fuselage, wherein said pod-connecting members collectively comprise:
      at least one fuselage track positioned inside said fuselage housing; and
      at least one pod track complementary to said at least one fuselage track;
      wherein said at least one fuselage track and said at least one pod track extend along the axis (X-X); and
      wherein one of said at least one fuselage track and said at least one pod track comprises a ferromagnetic material, and the other of said at least one fuselage track and said at least one pod track comprises a superconducting electromagnet that is configurable between an active configuration, in which it generates a magnetic field, and a passive configuration;
   wherein the airplane is configurable in:
      an operating configuration, suitable for allowing flight of the airplane, in which the at least one passenger pod is housed in the fuselage housing; and
      an emergency configuration, in which, with the airplane in flight, the at least one passenger pod is ejected from the fuselage housing; and
   wherein in said emergency configuration said pod-connecting members are commanded into a release configuration so as to allow the at least one passenger pod to be ejected from the fuselage housing.

2. The airplane of claim 1, wherein the fuselage further comprises an operating opening through which, in the emergency configuration, the at least one passenger pod is ejected.

3. The airplane of claim 2, wherein the fuselage extends axially between a nose end, proximal to the nose group, and a tail end, proximal to the tail group, and wherein the operating opening is positioned in said tail end transversely to the axis (X-X).

4. The airplane of claim 3, wherein the tail group comprises a movable body configurable to open to allow the at least one passenger pod to leave the fuselage housing through the operating opening.

5. The airplane of claim 1, wherein the at least one fuselage track and the at least one pod track are positioned in a lower region of the fuselage housing.

6. The airplane of claim 1, wherein the at least one fuselage track and the at least one pod track are commandable to eject the at least one passenger pod from the fuselage housing.

7. The airplane of claim 1, wherein the at least one passenger pod comprises a drogue parachute group comprising a drogue parachute device, and wherein, in the emergency configuration, said drogue parachute device is configurable to axially pull the at least one passenger pod out of the fuselage housing.

8. The airplane of claim 7, comprising a plurality of passenger pods mutually connected and housable in a row along the axis (X-X) in the fuselage housing, wherein the drogue parachute group is configurable to pull each passenger pod out of the fuselage housing.

9. The airplane of claim 7, wherein the drogue parachute group comprises at least one parachute device configurable to slow a fall of the at least one passenger pod.

10. The airplane of claim 7, wherein the drogue parachute group comprises at least one inflatable floating device configurable to keep the at least one passenger pod afloat when landed on water.

11. The airplane of claim 1, wherein the at least one passenger pod comprises a cargo hold room comprised in the pod wall and separated from the pressurized passenger housing, and wherein said cargo hold room is pressurized and suitable for holding pets, goods, and luggage.

12. The airplane of claim 1, wherein in said operating configuration, said at least one fuselage track and said at least one pod track are held in contact by magnetic force, and wherein in said emergency configuration, said at least one pod track is released from said at least one fuselage track.

* * * * *